Patented Jan. 18, 1944

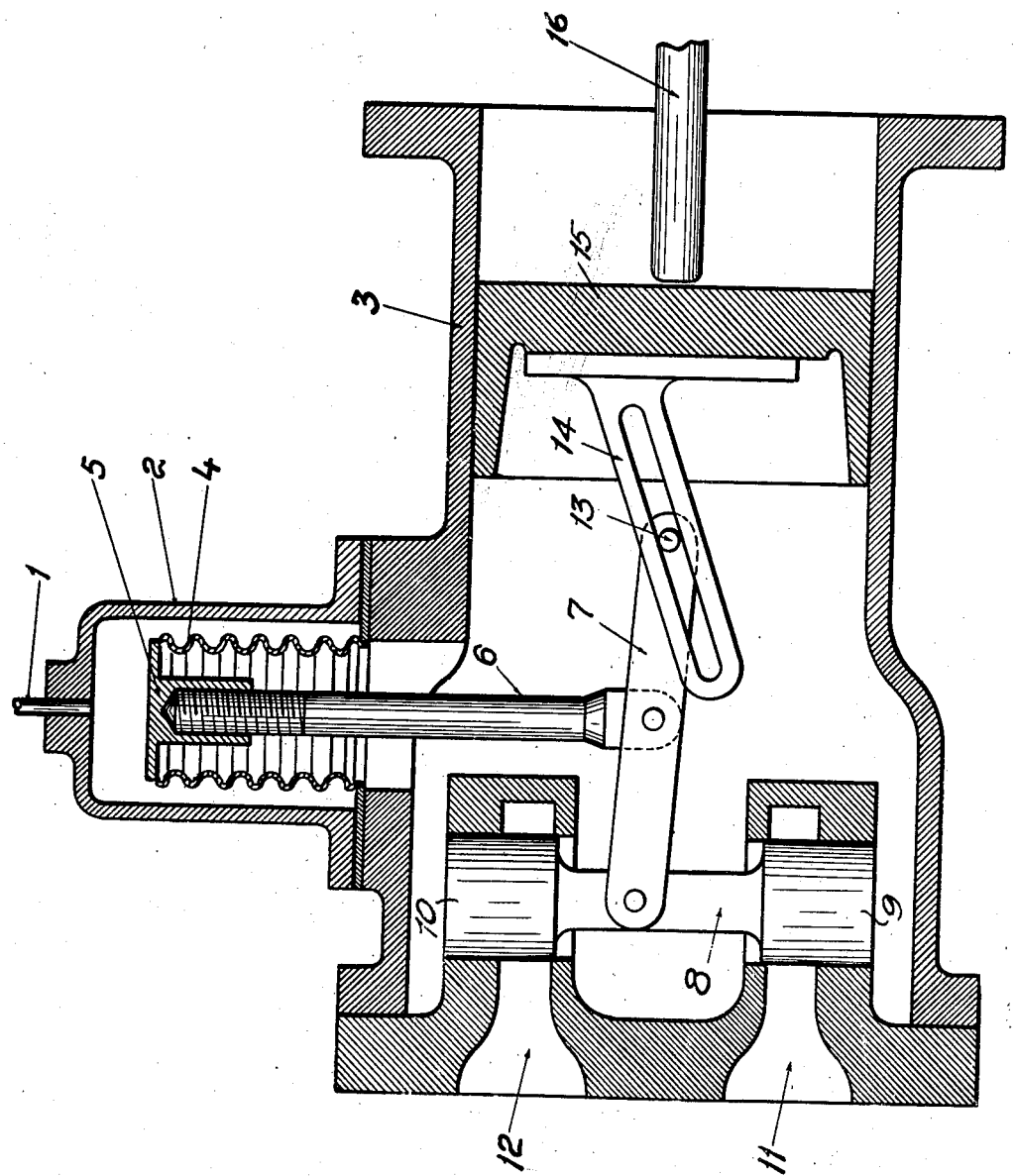

2,339,592

UNITED STATES PATENT OFFICE 2,339,592

SERVOMOTOR

Harald Svenning Wenander, Lund, Sweden

Application December 18, 1940, Serial No. 370,618
In Sweden October 17, 1939

4 Claims. (Cl. 121—41)

My invention relates to a servomotor for vehicles, such as motor cars, aeroplanes, ships and so on, which is substantially characterized by the fact that it is adapted to be operated by a control member actuating a rod system in the servomotor, said rod system being connected with a slide member regulating the inlet and outlet for the pressure fluid of the servomotor as well as with the piston of the servomotor, in order that the pressure actuating the servomotor piston and the displacement of the piston respectively shall be substantially proportional to the pressure exerted on the control member and the displacement of said member respectively.

The accompanying drawing illustrates diagrammatically a sectional side view of an embodiment of the invention.

According to the drawing the transmitting member between the control member and the servomotor comprises a pipe 1 containing a suitable pressure fluid such as oil. This pipe opens into a separate casing 2 for a bellows, which casing is located on the servomotor and which is separated from the cylinder chamber 3 of the servomotor by means of a bellows 4. Said bellows is provided with an upper cover 5 which is adapted to receive a rod 6, one end of which is screwed into the cover, the other end being jointed approximately to the middle portion of a lever 7. One end of said lever is jointed to a slide member 8, the two pistons 9 and 10 of which regulate the inlets and outlets 11 and 12 for the pressure fluid in the cylinder chamber 3. The other end of the lever 7 is slidably mounted in a slotted guide 14 by means of a pivot 13, said guide being fixed to a piston 15. The piston is displaceable in the cylinder chamber 3, and is adapted to actuate a member 16 connected with the member to be operated in the vehicle. Instead of a pipe containing pressure fluid the transmitting member may comprise a purely mechanical means, for example a rope, rod or the like, which can directly actuate the rod system of the servomotor.

The servomotor operates in the following manner. The pressure fluid in the pipe 1 and in the casing 2 is actuated by a control member in a suitable manner, for example through a bellows connected to the pipe 1, in such a way that the bellows 4 is compressed. During this compression, the rod 6 is moved downward and since this motion actuates the lever 7 the lever causes also the slide member 8 to move downward so that the piston 9 uncovers the opening 11, whereby pressure fluid, preferably oil, flows into the cylinder chamber 3 and displaces the piston 15 to the right in the figure, the means to be operated, for example rudder, brake or the like, being then actuated. If the control member is not further actuated, the pressure in the casing 2 is not changed, either. The rod 6 may now be considered as immovable and therefore the lever 7 is swung by the motion of the piston 15 in such a way that the slide member 8 moves upward and the piston 9 shuts off the inlet for the pressure fluid. If the pressure on the control member ceases, the pressure fluid in the cylinder chamber 3 presses the bellows 4 and consequently the rod 6 upward, the piston 10 of the slide member opening the outlet pipe 12 for the pressure fluid. Thus, a certain position of the rod 6 corresponds to a definite position of the piston 15. One can feel the exerted pressure directly by means of the control member since the pressure exerted on the bellows 4 by the pressure fluid in the cylinder chamber is transmitted to the control member directly and without friction.

The servomotor is preferably disposed at the motor, and the inlet 11 and outlet 12 may then be connected either to a special pressure fluid pump or preferably to the lubricating oil pump of the motor.

The advantages of the described hydraulic transmission of the motion from the control member to the servomotor are the absence of friction due to the lack of levers, links and so on, as well as the possibility of placing the sevromotor at the desired place.

Of course, the invention is not limited to the disclosed embodiment, but its details may be varied within the scope of the invention.

Having now described my invention, what I claim as new and desire to secure by Letters Patent is:

1. A servomotor having a cylinder and a piston displaceable therein, inlet and outlet ports in said cylinder, for admitting and discharging pressure fluid, a slidable regulating member for controlling said ports, a guide member on said piston, a link connecting said guide member with said regulating member, a rod one end of which is attached intermediately to said link and the other end of which is connected to a pressure responsive member, said regulating member, link, and piston guide all being located in the pressure end of said cylinder.

2. A servomotor having a cylinder and a piston displaceable therein, inlet and outlet ports in said cylinder, for admitting and discharging pressure fluid, a slidable regulating member for controlling said ports, a guide member on said piston, a link connecting said guide member with said regulating member, a casing connected to said cylinder, a pressure responsive member in said casing, means for admitting fluid pressure to said casing, a rod one end of which is attached to said link and the other end of which is connected to said pressure responsive member, said regulating member, link, and piston guide all being located in the pressure end of said cylinder.

3. A servomotor having a cylinder and a piston displaceable therein, inlet and outlet ports in said cylinder, for admitting and discharging pressure fluid, a slidable regulating member for controlling said ports, a guide member on said piston, a link connecting said guide member with said regulating member, a casing secured to said cylinder, means for admitting fluid pressure to said casing, a pressure responsive member in said casing having one end exposed to pressure existing in said cylinder, a rod one end of which is attached to said link and the other end of which is connected to said pressure responsive member, said regulating member, link and piston guide all being located in the pressure end of said cylinder.

4. A servomotor having a cylinder and a piston displaceable therein, inlet and outlet ports in said cylinder for admitting and discharging pressure fluid, a slidable regulating member for controlling said ports, a fixed slotted guide member on said piston, a link connected to said regulating member and having a pin engaging said slotted guide member, a casing connected to said cylinder, means for admitting pressure fluid to said casing, a bellows in said casing responsive to said pressure fluid and to the pressure existing in said cylinder, a rod secured at one end to said bellows and having its other end pivotally connected to said link, said link, regulating member and slotted guide member all being located within the pressure end of the said cylinder.

HARALD SVENNING WENANDER.